United States Patent
Van et al.

(10) Patent No.: US 12,440,527 B2
(45) Date of Patent: Oct. 14, 2025

(54) ORGANIC SOL-GEL NANO-COMPOSITION FROM PANAX NOTOGINSENG, RUTIN, GINKGO BILOBA EFFECTIVE IN ENHANCING CEREBRAL AND CARDIOVASCULAR PROTECTION AND METHOD OF PRODUCING THEREOF

(71) Applicant: Nguyen Anh Van, Hanoi (VN)

(72) Inventors: Nguyen Anh Van, Hanoi (VN); Nguyen Duc Nghia, Hanoi (VN); Kieu Dinh Hung, Hanoi (VN); Nguyen Thi Ngoc Binh, Hanoi (VN)

(73) Assignee: Nguyen Anh Van, Hanoi (VN)

( * ) Notice: Subject to any disclaimer, the term of this patent is extended or adjusted under 35 U.S.C. 154(b) by 473 days.

(21) Appl. No.: 17/925,366

(22) PCT Filed: Dec. 4, 2020

(86) PCT No.: PCT/VN2020/000017
§ 371 (c)(1),
(2) Date: Nov. 15, 2022

(87) PCT Pub. No.: WO2021/232070
PCT Pub. Date: Nov. 18, 2021

(65) Prior Publication Data
US 2023/0338448 A1 Oct. 26, 2023

(30) Foreign Application Priority Data
May 15, 2020 (VN) .............. 1-2020-02787

(51) Int. Cl.
| | | |
|---|---|---|
| A61K 36/16 | (2006.01) | |
| A61K 9/1271 | (2025.01) | |
| A61K 9/1277 | (2025.01) | |
| A61K 31/7048 | (2006.01) | |
| A61K 36/258 | (2006.01) | |
| A61K 47/24 | (2006.01) | |
| A61K 47/26 | (2006.01) | |
| A61P 25/06 | (2006.01) | |
| A61P 25/08 | (2006.01) | |

(52) U.S. Cl.
CPC ............ *A61K 36/16* (2013.01); *A61K 9/1271* (2013.01); *A61K 9/1277* (2013.01); *A61K 31/7048* (2013.01); *A61K 36/258* (2013.01); *A61K 47/24* (2013.01); *A61K 47/26* (2013.01); *A61P 25/06* (2018.01); *A61P 25/08* (2018.01)

(58) Field of Classification Search
None
See application file for complete search history.

(56) References Cited

FOREIGN PATENT DOCUMENTS

| | | |
|---|---|---|
| CN | 1552334 A | 12/2004 |
| CN | 108125999 A | 6/2018 |
| CN | 109432433 A | 3/2019 |
| SK | 500922012 U1 * | 10/2012 |

* cited by examiner

*Primary Examiner* — Melissa S Mercier
(74) *Attorney, Agent, or Firm* — NKL Law; Jae Youn Kim

(57) ABSTRACT

An organic sol-gel nano-composition containing three solid lipid nano-components loaded with phytochemical active ingredients is proposed. Panax notoginseng saponins are extracted from Vietnamese Panax notoginseng. Rutin is extracted from Styphnolobium japonicum in Thai Binh Province, Vietnam, and Ginkgo biloba is extracted from Ginkgo biloba trees. The composition has shown to have low toxicity and great bioavailability. In particular, the composition is effective against local myocardial ischemias and arrhythmias, improves the blood rheology, platelet circulation and antiaggregation, and thrombosis, lowers the blood lipids to a certain limit, and has good effects against atherosclerosis. The composition has an antioxidant effect of preventing free radical damages, and has an effect of enhancing capillary resistance, strengthening the vessel walls that reduces hypertension risks, which accordingly protects the cerebral nerves, prevents strokes, and is also used to recover after strokes and other hemorrhagic diseases for the enhancement effects and reconstruction of the damaged blood vessels.

2 Claims, 4 Drawing Sheets

Graph 1. Baseline pain threshold of the mouse batches over time

Graph 2. Pain threshold after treatment of the mouse batches over time

ORGANIC SOL-GEL NANO-COMPOSITION FROM PANAX NOTOGINSENG, RUTIN, GINKGO BILOBA EFFECTIVE IN ENHANCING CEREBRAL AND CARDIOVASCULAR PROTECTION AND METHOD OF PRODUCING THEREOF

FIELD OF THE INVENTION

The present invention relates to an organic sol-gel nano-composition containing Panax notoginseng saponins, rutin, and Ginkgo biloba that is effective in enhancing cerebral and cardiovascular protection and a method of producing thereof.

BACKGROUND OF THE INVENTION

Panax Notogingseng Saponins

Panax notoginseng is a type of ginseng of Araliaceae family whose roots are used as medicines, Panax notoginseng is a longtime traditional medicine, wherein Panax notoginseng roots are effective in improving vascular circulation, improving blood stagnation and stasis, slightly reducing swelling and pain, with more than 10 types of extracted saponins included therein. The main components are saponins Rb1 and Rg1 of higher contents than in ginsengs. The total saponins extracted from Panax notoginseng roots have been taken to make drugs for decades. The chemical structures of the main active components of Panax notoginseng saponins are shown in FIG. 1.

Rutin

Rutin, also referred to as rutoside, quercetin-3-rutinoside, and sophorin, is a citrus flavonoid glycoside found in buckwheat (Kreft et al., 1997). Chemically, it is a glycoside comprising flavonolic aglycone quercetin along with disaccharide rutinose. It has been proved with some pharmacological activities, including antioxidation, cytologic protection, vascular protection, anticarcinogenesis, neuroprotection, and cardiac protection.

Ginkgo Biloba

Ginkgo biloba is the scientific name of a type of woody plant with fan-shaped leaves of Ginkgoaceae family (ginkgo). The chemical components of the extracts from ginkgo leaves are also tested. The name and structure of ginkgolides in Ginkgo biloba is shown in FIG. 2. Both types of bilobalides and ginkgolides are the main components of Ginkgo biloba which exhibit all biological and/or pharmacological activities of Ginkgo biloba. However, it is not clear about the fundamental mechanism of the molecules also in interaction with pharmaceuticals during such treatment. Kaempferol is a metabolite of quercetin and isorhamnetin is a metabolite of kaempferol. The commercial Ginkgo biloba of Ginkgo biloba leaves is enriched with water-acetone or water-ethanol of the extract from ginkgo leaves, and standardized to their flavonoid contents or three times thereof. These components can induce such effects as mental alteration and memory improvement for their characteristics of promoting neuronal growth and the flavanol antioxidants of Ginkgo biloba.

Pharmacological efficacy of Ginkgo biloba: Ginkgo biloba is effective in the treatment of coronary artery disease, arrhythmia, diabetic cardiomyopathy, dementia, and cerebral infarction, and lipid regulation.

To combine the above ingredients for synergistic effects, the composition of the present invention prepared according to the solid lipid nanotechnology comprises multiple lipid drug conjugate nanoparticles (LDCN). Currently, this has been the most modern nano-drug formulation technology. The technology can allow the loading of multiple pharmaceutical ingredients in the nanoparticles. Such lipid nanoparticles have co-bioavailability, and treatment efficacy in accordance with the conjugate potentiation effect, resulting in great therapeutic effectiveness.

SUMMARY OF THE INVENTION

The objective of the present invention is to provide an organic sol-gel nano-composition comprises the following components:
(a) Solid lipid nano Ginkgo biloba: 15-30%;
(b) Solid lipid nano rutin: 0.1-10%;
(C) Solid lipid nano Panax notoginseng saponins: 5-25%;
(d) Soy bean oil: 40-65%;
(e) Lecithin: 1-10%;
(f) Tween 80:0.1-5%.

Other objectives of the present invention is to provide a process for preparing the aforementioned composition of the following components:
i) Preparing a carrier solution;
ii) Preparing a conjugated nano lipid pre-suspension of three active ingredients/carriers;
iii) Preparing a conjugated pre-sol-gel lipid nano-composition of three active ingredients; and
iv) Preparing a conjugated sol-gel lipid nano-composition of three active ingredients;
v) Obtaining a finished composition.

DETAILED DESCRIPTION OF THE INVENTION

Figure 1:
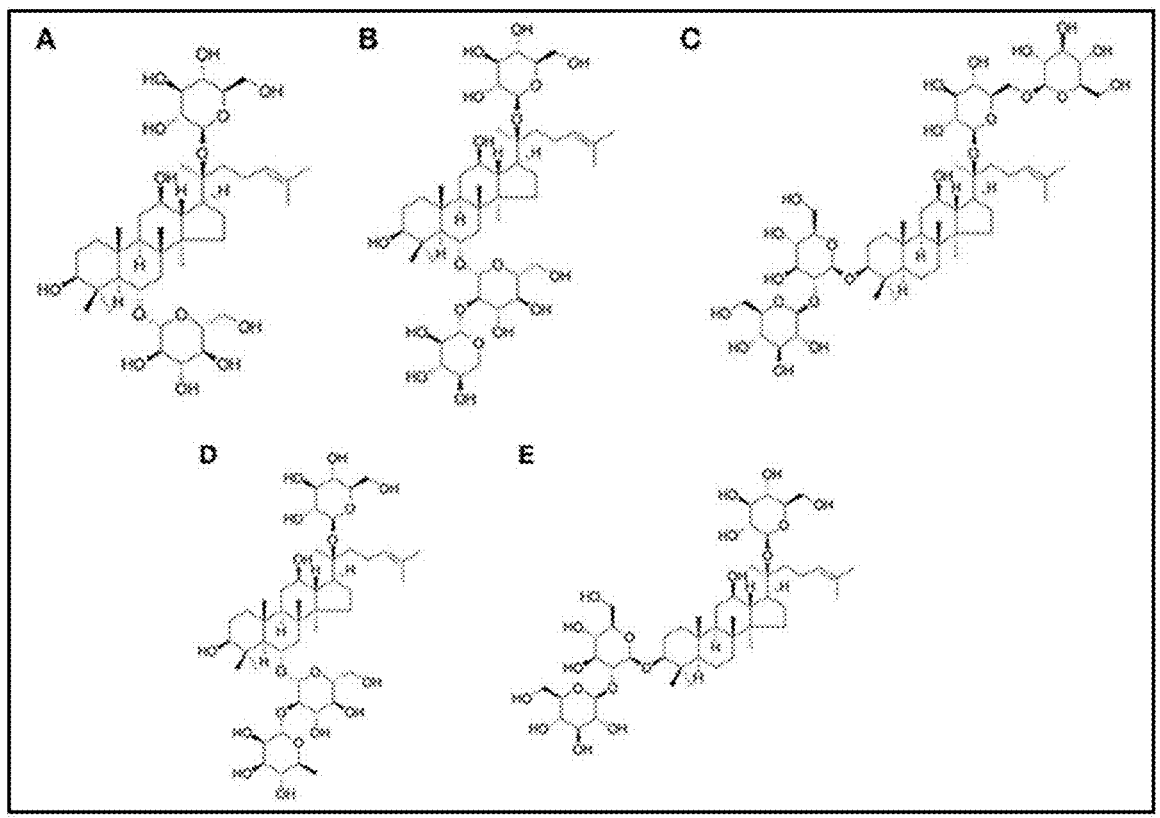
FIG. 1 shows the chemical structures of the main components of Panax notoginseng saponins.
Figure 2:
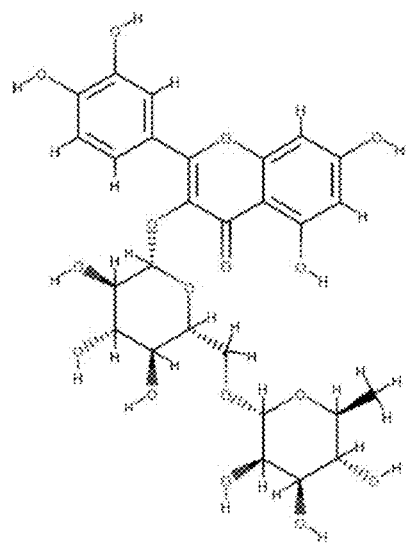
FIG. 2 shows the chemical structure of rutin.
Figure 3:
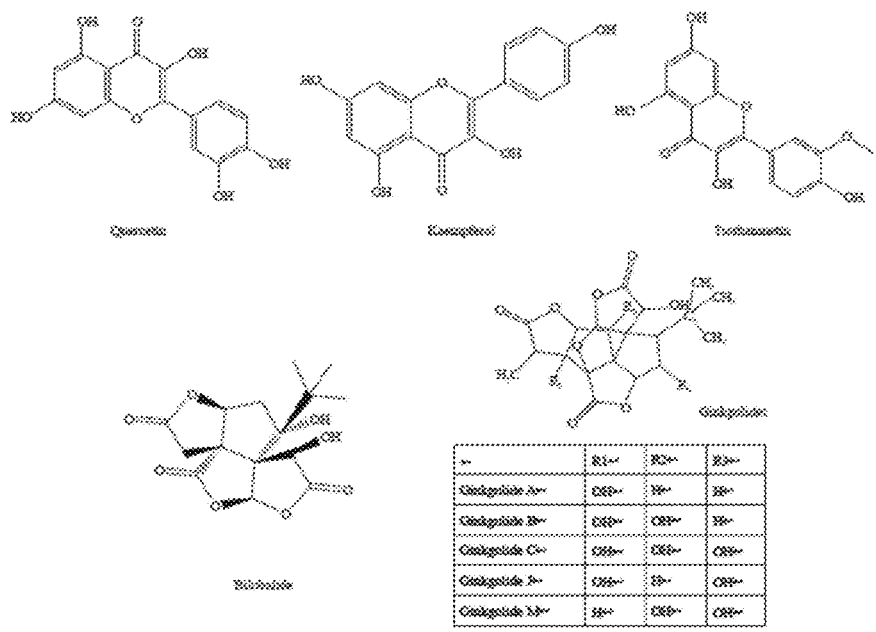
FIG. 3 shows the chemical of Ginkgo biloba.
Figure 4:
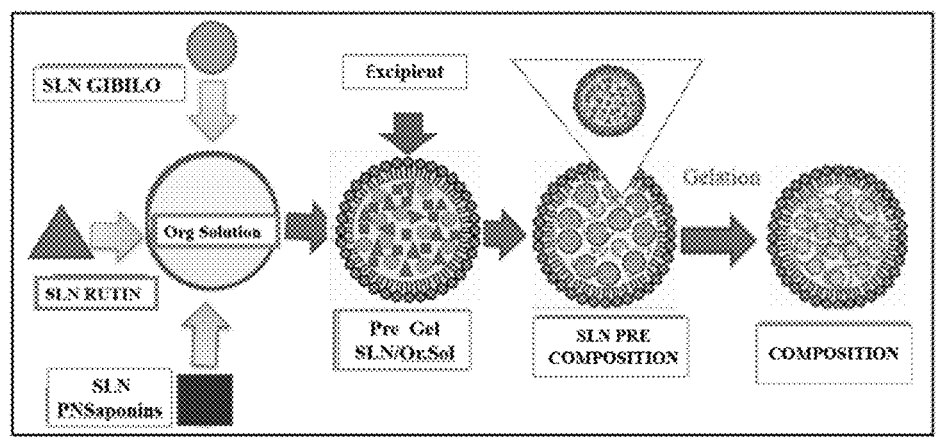
FIG. 4 illustrates a process of preparing a composition effective in enhancing cerebral and cardiovascular protection.
Figure 5:
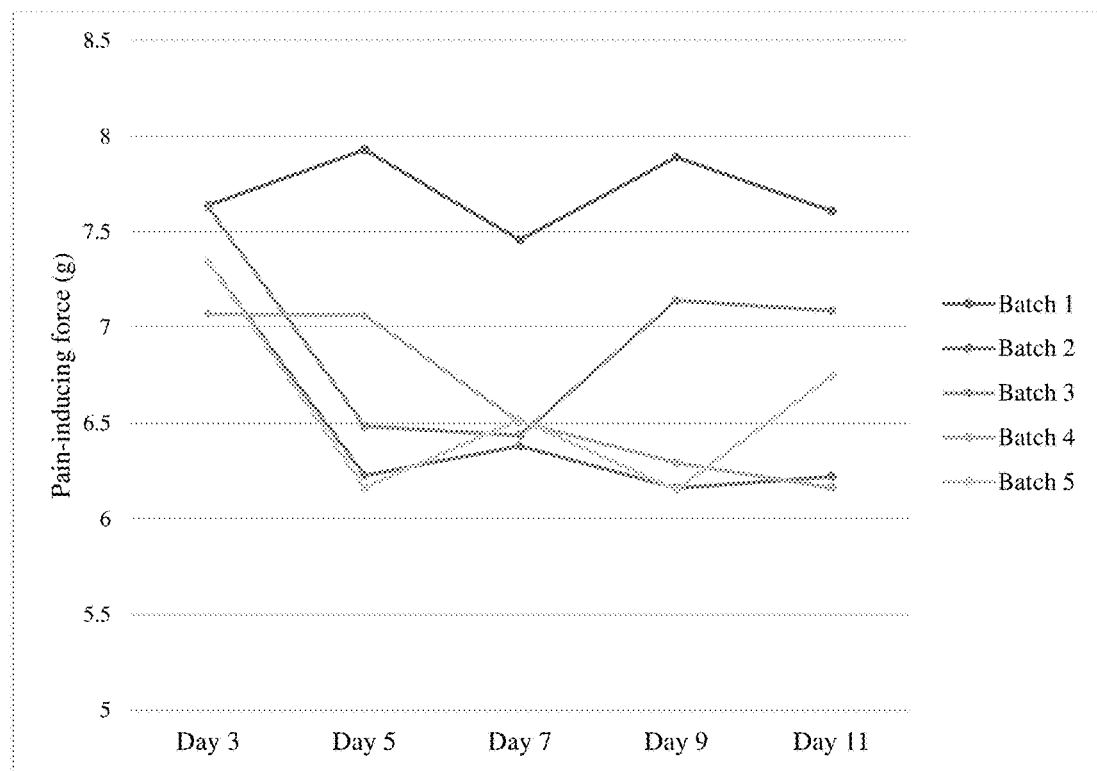
FIG. 5 represents Graph 1: Baseline pain threshold of the mouse batches over time.
Figure 6:
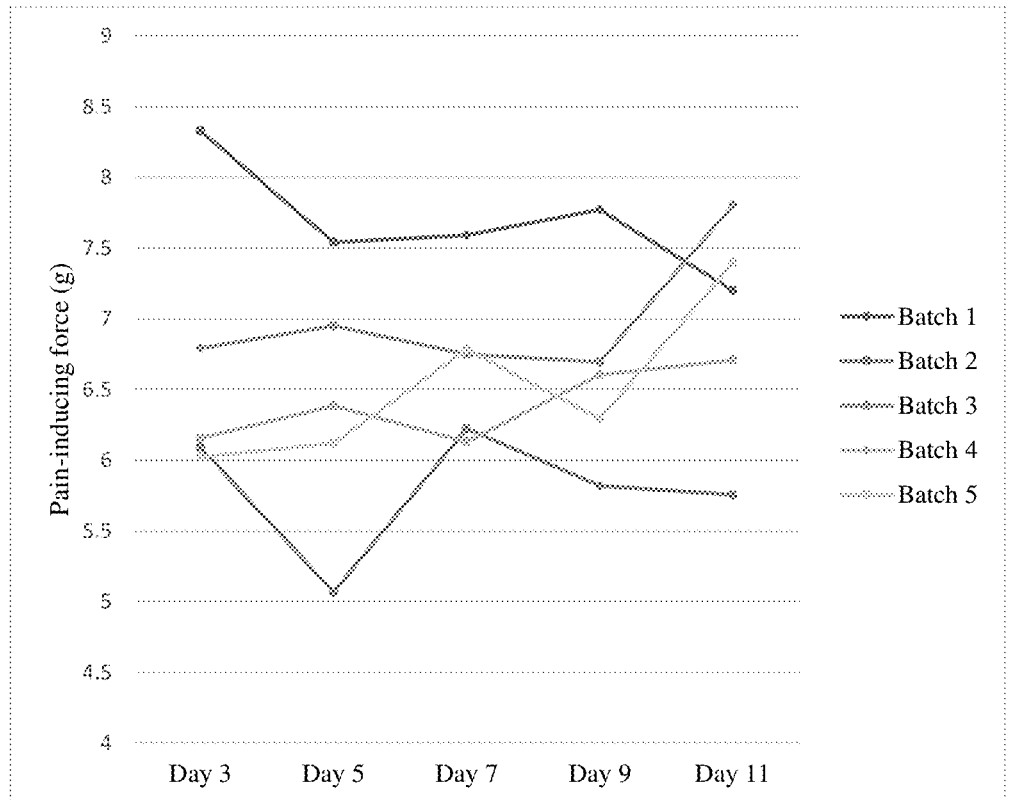
FIG. 6 represents Graph 2: Pain threshold after treatment of the mouse batches over time.

The organic sol-gel nano-composition according to the invention comprises the following components:
(a) Solid lipid nano Ginkgo biloba: 15-30%;
(b) Solid lipid nano rutin: 0.1-10%;
(C) Solid lipid nano Panax notoginseng saponins: 5-25%;
(d) Soy bean oil: 40-65%;
(e) Lecithin: 1-10%
(f) Tween 80:0.1-5%

Panax notoginseng saponins (PNS) is extracted from Vietnamese Radix notoginseng (Panax pseudo-ginseng) with ethyl alcohol solvent.

Panax Notoginseng Saponins (PNS) solid lipid nanoparticles purchased from Vietlife Nano Biological Manufactory have the following parameters: an average nanoparticle size of 9.94 nm, and the PNS content in nanoparticles is over 22%.

Rutin is extracted in ethyl alcohol solvent from Styphnolobium japonicum (Sophora japonica) from Thai Binh province.

Rutin solid lipid nanoparticles purchased from Vietlife Biological Nano Manufactory have the following parameters: an average nanoparticle size of 11.25 nm, and the rutin content in the nanoparticles is over 22%.

Ginkgo biloba is purchased from Shaan Meihe Biochemics Co. Ltd (China).

Solid lipid Ginkgo biloba (GBLB) nanoparticles purchased from Vietlife Biological Nano Manufactory have the following specifications: an average nanoparticle size of 9.943 nm, and the GBLB content in the nanoparticles is over 22%.

In addition, there are included excipient materials such as glyceril monostearate, stearic acid, magnesium stearate, Tween 80, lecithin, Gac oil, and soybean oil. All of these are raw materials for use according to Vietnamese standards as pharmaceutical formulative materials in accordance with the regulations.

Equipments used according to the invention include a heated gelating device, a temperature controller, a vacuum forming device, and a controllable mixer.

The process for preparing the composition according to the invention comprises the following steps:

Step 1: Preparing a carrier solution: Add soy bean oil to a reaction flask. Heat the solution at 70-100° C., preferably 80° C. Evenly stir at 250-350 rpm, preferably 300 rpm. Next, add lecithin to the reaction flask. Boil and stir until complete dissolution. After about 30-50 minutes, preferably 45 minutes, further add the surfactant Tween 80 to the flask. Mildly boil and evenly stir in about 80-100 minutes, preferably 90 minutes, until the carrier solution becomes transparent.

Step 2: Preparing a conjugated lipid nano-presuspension of three active ingredients/carriers: Slowly add solid lipid nano Panax notoginseng saponins to the reaction flask while maintaining the temperature at 80-90° C. under fast stirring at 400-600 rpm, preferably 500 rpm. The mixture is stirred and boiled until the solid lipid nano Panax notoginseng saponins are completely dissolved. Further add solid lipid nano rutin thereto while maintaining the same temperature and stirring speed until the solid lipid nano rutin is completely dissolved. Then, add solid lipid nano Ginkgo biloba thereto while maintaining the same temperature and stirring speed until the solid lipid nano Ginkgo biloba is completely dissolved.

Step 3: Preparing a conjugated pre-sol-gel lipid nano-composition of three active ingredients: The carrier mixture containing three solid lipid nano components is mixed in about 3-24 hours. The reaction time depends on the content of each product batch: in lab for about 3 hours, semi-industrial production for about 7 hours, and industrial production for 18-24 hours.

Step 4: Preparing a conjugated sol-gel organic lipid nano-composition of three active ingredients: Adjust the contents of the organic sol-gel components to achieve the standard technical parameters, including the contents of Panax notoginseng saponins, rutin, and Ginkgo biloba.

Step 5: Obtaining a finished composition: The gel formation at gel resolution temperature comprises gelation at normal temperature (room temperature), storage temperature (below 24° C.), and gel resolution at 35-37° C. (human body temperature).

EXAMPLES

Example 1: Method of Preparing a Composition According to the Present Invention

One soft 900 mg capsule of the composition was produced using the following components:
(a) Solid lipid nano Ginkgo biloba: 250 mg;
(b) Solid lipid nano rutin: 25 mg;
(c) Solid lipid nano Panax notoginseng saponins: 125 mg;
(d) Soy bean oil: 450 mg;
(e) Lecithin: 40 mg;
(f) Tween 80: 10 mg.

450 mg of soy bean oil was added to a reaction flask, heated at 80° C. while evenly stirring at 300 rpm. Then, 40 mg of lecithin was added to the flask under boiling ad stirring until complete dissolution. 10 mg of Tween 80 was further added to the flask, lowered to below 80° C. and evenly stirred in 90 minutes. 125 mg of solid lipid nano Panax notoginseng saponins was slowly added to the reaction flask, with the temperature maintained at 90° C. and the stirring speed raised to 500 rpm. The stirring and boiling continued until complete dissolution. A similar procedure was conducted with solid lipid nano rutin and solid lipid nano Ginkgo biloba. The mixing was continued for 3 hours. The sol-gel components were adjusted to reach the content standards.

Example 2: Evaluation of the Vasomotor Pain Relieving Effects of the Composition on Chronic Migraine In the test, the white mice were randomly divided into 5 batches, each batch having 10 animals: Batch 1 (biological control) was subjected to oral administration of 0.2 ml/10 g water; batch 2 (model) injected 10 mg/kg with nitroglycerin (NTG) was subjected to oral administration of 0.2 mL/10 g water; batch 3 (positive control) injected with 10 mg/kg nitroglycerin was subjected to oral administration of 40 mg/kg propranolol; batch 4 injected with 10 mg/kg nitroglycerin was subjected to oral administration of the composition at dose of 0.96 pill/kg/day (equivalent to the clinical dose); batch 5 injected with 10 mg/kg nitroglycerin was subjected to oral administration of the composition at dose of 2.88 pill/kg/day (3 times as much as the clinical dose).

Test Results

Baseline Pain Threshold

TABLE 1

Effects of the composition on the pain-inducing force in the dolorimeter

| | | Pain-inducing force in the dolorimeter (g) | | | | |
|---|---|---|---|---|---|---|
| Mouse batch | nn | Day 3 | Day 5 | Day 7 | Day 9 | Day 11 |
| Batch 1: (biological control) | 110 | 7.6 ± 1.7 | 7.9 ± 0.9 | 7.5 ± 1.4 | 7.9 ± 1.2 | 7.6 ± 1.1 |
| Batch 2: (NTG 10 mg/kg) | 110 | 7.3 ± 1.6 | 6.2 ± 0.8 | 6.4 ± 0.7 | 6.2 ± 1.1 | 6.2 ± 0.5 |

TABLE 1-continued

Effects of the composition on the pain-inducing force in the dolorimeter

| Mouse batch | nn | Pain-inducing force in the dolorimeter (g) | | | | |
|---|---|---|---|---|---|---|
| | | Day 3 | Day 5 | Day 7 | Day 9 | Day 11 |
| p in comparison with the control | | >0.05 | <0.001 | <0.05 | <0.01 | <0.01 |
| Batch 3: 40 mg/kg Propranolol | 110 | 7.6 ± 1.5 | 6.5 ± 1.1 | 6.4 ± 1.0 | 7.1 ± 0.9 | 7.1 ± 1.0 |
| p in comparison with the control | | >0.05 | <0.001 | >0.05 | >0.05 | >0.05 |
| p in comparison with the model | | >0.05 | >0.05 | >0.05 | <0.05 | <0.05 |
| Batch 4: 0.96 pill/kg composition | 110 | 7.1 ± 1.3 | 7.1 ± 0.7 | 6.5 ± 1.1 | 6.3 ± 1.4 | 6.2 ± 0.9 |
| p in comparison with the control | | >0.05 | <0.05 | >0.05 | <0.05 | <0.01 |
| p in comparison with the model | | >0.05 | <0.05 | >0.05 | >0.05 | >0.05 |
| p in comparison with propranolol | | >0.05 | >0.05 | >0.05 | >0.05 | <0.05 |
| Batch 5: 2.88 pill/kg composition | 110 | 7.3 ± 1.1 | 6.2 ± 0.7 | 6.5 ± 0.8 | 6.2 ± 1.1 | 6.7 ± 0.6 |
| p in comparison with the control | | >0.05 | <0.001 | >0.05 | <0.01 | <0.05 |
| p in comparison with the model | | >0.05 | >0.05 | >0.05 | >0.05 | >0.05 |
| p in comparison with propranolol | | >0.05 | >0.05 | >0.05 | <0.05 | >0.05 |
| p in comparison with the low dose | | >0.05 | <0.05 | >0.05 | >0.05 | >0.05 |

Graph 1. Baseline Pain Threshold of the Mouse Batches over Time

Results from Table 1 and Graph showed that the baseline pain threshold of the mice in the model batch lowered at all time points of the study, most remarkably from day 5 to day 11 (p<0.05, p<0.01, and p<0.001).

The baseline pain threshold of the mouse batch subjected to oral administration of 40 mg/kg propranolol was greater than that of the model batch at almost all time points, most remarkably on day 9 and day 11 (p<0.05).

The baseline pain threshold of the mouse batch subjected to oral administration of the composition at dose of 0.96 pill/kg was greater than that of the model batch on day 5 (p<0.05), but was not different at other time points (p>0.05).

The baseline pain threshold of the mouse batch subjected to oral administration of the composition at dose of 2.88 pill/kg was greater than that of the model batch on day 11 (p<0.05), but was not different at other time points (p>0.05).

The effect of the composition at both doses was poorer in comparison with the 40 mg/kg propranolol.

Pain Threshold after Treatment

TABLE 2

Effects of the composition on the pain-inducing force in the dolorimeter

| Mouse batch | nn | Pain-inducing force on the dolorimeter (g) | | | | |
|---|---|---|---|---|---|---|
| | | Day 3 | Day 5 | Day 7 | Day 9 | Day 11 |
| Batch 1: (biological control) | 110 | 8.3 ± 1.2 | 7.6 ± 0.7 | 7.2 ± 1.1 | 7.8 ± 1.3 | 7.2 ± 0.7 |
| Batch 2: (NTG 10 mg/kg) | 110 | 6.1 ± 0.9 | 5.1 ± 1.1 | 6.2 ± 0.5 | 5.8 ± 0.6 | 5.8 ± 0.8 |
| p in comparison with the control | | <0.001 | <0.001 | <0.05 | <0.001 | <0.01 |
| Batch 3: 40 mg/kg Propranolol | 110 | 6.8 ± 1.2 | 7.0 ± 1.0 | 6.7 ± 0.5 | 6.7 ± 0.5 | 7.8 ± 0.7 |
| p in comparison with the control | | <0.05 | >0.05 | >0.05 | <0.05 | <0.01 |
| p in comparison with the model | | >0.05 | <0.01 | <0.05 | <0.01 | <0.001 |
| Batch 4: 0.96 pill/kg composition | 110 | 6.2 ± 1.2 | 6.4 ± 1.3 | 6.1 ± 1.1 | 6.6 ± 0.7 | 6.7 ± 1.0 |
| p in comparison with the control | | <0.001 | <0.05 | >0.05 | <0.05 | >0.05 |
| p in comparison with the model | | >0.05 | <0.05 | >0.05 | <0.05 | <0.05 |
| p in comparison with propranolol | | >0.05 | >0.05 | >0.05 | >0.05 | <0.05 |
| Batch 5: 2.88 pill/kg composition | 110 | 6.0 ± 1.1 | 6.0 ± 0.8 | 6.8 ± 0.6 | 6.3 ± 0.3 | 7.4 ± 1.4 |
| p in comparison with the control | | <0.001 | <0.01 | >0.05 | <0.01 | >0.05 |
| p in comparison with the model | | >0.05 | <0.05 | <0.05 | <0.05 | <0.01 |
| p in comparison with propranolol | | >0.05 | >0.05 | >0.05 | >0.05 | >0.05 |
| p in comparison with the low dose | | >0.05 | >0.05 | >0.05 | >0.05 | >0.05 |

Graph 2. Pain Threshold after Treatment of Mouse Batches over Time

Results from Table 2 and Graph 2 showed that:

The pain threshold after NTG injection of the mice in the model batch was remarkably lower at all time points of the study (p<0.05, p<0.01, and p<0.001).

Pain threshold after the oral drug administration of the mice in the oral 40 mg/kg propranolol batch was greater than that of the model batch at all time points, which was most remarkable from day 5 to day 11 (p<0.05, p<0.01, and p<0.001).

The pain threshold after the oral drug administration of the mice in the oral 0.96 pill/kg composition batch was greater than that of the model batch at almost all time points, most remarkably on day 5, day 9, and day 11 (p<0.05). The effect was poor in comparison with the 40 mg/kg propranolol.

The pain threshold after the oral drug administration of the mice in the oral 2.88 pill/kg composition batch was greater than that of the model batch at almost all time points, most remarkably from day 5 to day 11 (p<0.05, and p<0.01). The effect was equivalent to the 40 mg/kg propranolol.

CONCLUSION

The composition at doses of 0.96 pill/kg and 2.88 pill/kg were effective in lowering the pain threshold after treatment in the chronic migraine model.

The composition at dose of 2.88 pill/kg was more effective than at dose of 0.96 pill/kg and was equivalent to the 40 mg/kg propranolol.

Example 3: Studies on the Sedative Effect of the Composition on the Advanced Plus Model In the test, the white mice were randomly divided into 4 batches, each batch having 10 animals: Batch 1 (biological control) was subjected to oral administration of 20 mL/kg/day distilled water; batch 2 (positive control) was subjected to oral administration of 2.4 mg/kg/day diazepam; batch 3 was subjected to oral administration of the composition at dose of 0.96 pill/kg/day (equivalent to the clinical dose); batch 4 was subjected to oral administration of the composition at dose of 2.88 pill/kg/day (3 times as much as the clinical dose).

Results

TABLE 3

Effect of the composition on the number of times and time of mouse introduction into the the close branch

| Mouse batch | n | Number of times of mouse introduction into the close branch | | Time of mouse introduction into the close branch (second) | |
|---|---|---|---|---|---|
| | | Before oral administration of the drug | After 7 days of oral administration of the drug | Before oral administration of the drug | After 7 days of oral administration of the drug |
| Batch 1: Biological control | 10 | 11.10 ± 2.56 | 10.50 ± 2.80 | 176.70 ± 33.77 | 182.10 ± 36.27 |
| Batch 2: Diazepam at 2.4 mg/kg/day | 10 | 11.50 ± 2.32 | 6.40 ± 2.07 | 173.70 ± 36.50 | 121.20 ± 27.18 |
| p in comparison with batch 1 | | >0.05 | <0.01 | >0.05 | <0.01 |
| Batch 3: Composition of 0.96 pill/kg/day | 10 | 10.60 ± 3.34 | 7.50 ± 2.42 | 187.10 ± 41.02 | 136.70 ± 40.32 |
| p in comparison with batch 1 | | >0.05 | <0.05 | >0.05 | <0.05 |
| p in comparison with batch 2 | | >0.05 | >0.05 | >0.05 | >0.05 |
| Batch 4: Composition of 2.88 pill/kg/day | 10 | 10.90 ± 2.38 | 6.10 ± 2.02 | 182.10 ± 39.03 | 124.90 ± 26.48 |
| p in comparison with batch 1 | | >0.05 | <0.01 | >0.05 | <0.01 |
| p in comparison with batch 2 | | >0.05 | >0.05 | >0.05 | >0.05 |

Results from Table 3 showed that after 7 days of oral administration of 2.4 mg/kg/day diazepam and the composition at doses of 0.96 pill/kg/day and 2.88 pill/kg/day, the number of times and time mouse introduction into the close end was lower in comparison with the drug pretest and in comparison with the biological control batch, wherein the difference was statistically significant (p<0.05). The effect of the composition at both doses was equivalent to the 2.4 mg/kg/day diazepam.

TABLE 4

Effect of the composition on the number of times and time of mouse introduction into the open branch

| Mouse batch | n | Number of times of mouse introduction into the open branch | | Time of mouse introduction into the open branch (second) | |
|---|---|---|---|---|---|
| | | Before oral administration of the drug | After 7 days of oral administration of the drug | Before oral administration of the drug | After 7 days of oral administration of the drug |
| Batch 1: Biological control | 10 | 3.90 ± 1.20 | 3.70 ± 1.06 | 84.50 ± 24.66 | 80.40 ± 26.73 |
| Batch 2: Diazepam at 2.4 mg/kg/day | 10 | 4.30 ± 1.42 | 6.90 ± 2.33 | 90.40 ± 29.51 | 150.10 ± 26.36 |

TABLE 4-continued

Effect of the composition on the number of times and time of mouse introduction into the open branch

| Mouse batch | n | Number of times of mouse introduction into the open branch | | Time of mouse introduction into the open branch (second) | |
|---|---|---|---|---|---|
| | | Before oral administration of the drug | After 7 days of oral administration of the drug | Before oral administration of the drug | After 7 days of oral administration of the drug |
| p in comparison with batch 1 | | >0.05 | <0.001 | >0.05 | <0.001 |
| Batch 3: Composition of 0.96 pill/kg/day | 10 | 3.70 ± 1.16 | 6.10 ± 2.13 | 81.70 ± 26.59 | 131.80 ± 39.40 |
| p in comparison with batch 1 | | >0.05 | <0.05 | >0.05 | <0.01 |
| p in comparison with batch 2 | | >0.05 | >0.05 | >0.05 | >0.05 |
| Batch 4: Composition of 2.88 pill/kg/day | 10 | 4.10 ± 1.10 | 6.50 ± 2.12 | 83.80 ± 27.58 | 148.40 ± 33.08 |
| p in comparison with batch 1 | | >0.05 | <0.01 | >0.05 | <0.001 |
| p in comparison with batch 2 | | >0.05 | >0.05 | >0.05 | >0.05 |

Results from Table 4 showed that after 7 days of oral administration of 2.4 mg/kg/day diazepam and the composition at doses of 0.96 pill/kg/day and 2.88 pill/kg/day, the number of times and time of mouse introduction into the intake end increased in comparison with the drug pretest and in comparison with the biological control batch, wherein the difference was statistically significant (p<0.05). The effect of the composition at both doses was equivalent to the 2.4 mg/kg/day diazepam.

TABLE 5

Effect of the composition on avoidance rate at the open branch of the mice

| Mouse batch | n | Avoidance rate at the open branch | | $p_{before-after}$ |
|---|---|---|---|---|
| | | Before oral administration of the drug | After 7 days of oral administration of the drug | |
| Batch 1: Biological control | 10 | 70.47 ± 7.55 | 71.37 ± 7.75 | >0.05 |
| Batch 2: Diazepam at 2.4 mg/kg/day | 10 | 69.21 ± 8.88 | 46.37 ± 9.21 | <0.0001 |
| p in comparison with batch 1 | | >0.05 | <0.0001 | |
| Batch 3: Composition of 0.96 pill/kg/day | 10 | 71.44 ± 8.08 | 52.90 ± 7.84 | <0.001 |
| p in comparison with batch 1 | | >0.05 | <0.0001 | |
| p in comparison with batch 2 | | >0.05 | >0.05 | |
| Batch 4: Composition of 2.88 pill/kg/day | 10 | 70.20 ± 9.23 | 47.15 ± 9.96 | <0.0001 |
| p in comparison with batch 1 | | >0.05 | <0.0001 | |
| p in comparison with batch 2 | | >0.05 | >0.05 | |

Results from Table 5 showed that after 7 days of oral administration of 2.4 mg/kg/day diazepam and the composition at doses of 0.96 pill/kg/day and 2.88 pill/kg/day, the avoidance rate at the intake end of the mice reduced in comparison with the drug pretest and in comparison with biological control batch, wherein the difference was statistically significant (p<0.001). The effect of the composition at both doses was equivalent to the 2.4 mg/kg/day diazepam.

Example 4: Anticonvulsant Effect Evaluation of the Composition

In the test, the white mice were randomly divided into 4 batches, each batch having 10 animals: Batch 1 (biological control) was subjected to oral administration of 20 mL/kg/day distilled water; batch 2 (positive control) was subjected to oral administration of 2.4 mg/kg/day diazepam; batch 3 was subjected to oral administration of the composition at dose of 0.96 pill/kg/day (equivalent to the clinical dose); batch 4 was subjected to oral administration of the composition at dose of 2.88 pill/kg/day (3 times as much as the clinical dose). After the mice were injected with nikethamide, the time of convulsion onset and the death time of the mice were taken.

TABLE 6

Effects of the composition on the time of convulsion onset and the death time of the mice after nikethamide injection

| Mouse batch | n | Time of convulsion onset (minute) | Death time of the mice after nikethamide injection (minute) |
|---|---|---|---|
| Batch 1: Mô hình | 10 | 1.37 ± 0.36 | 8.31 ± 2.41 |
| Batch 2: Diazepam at 2.4 mg/kg/day | 10 | 2.08 ± 0.55 | 14.91 ± 3.67 |
| p in comparison with batch 1 | | <0.01 | <0.001 |
| Batch 3: Composition at dose of 0.96 pill/kg/day | 10 | 1.41 ± 0.44 | 8.83 ± 2.55 |
| p in comparison with batch 1 | | >0.05 | >0.05 |
| p in comparison with batch 2 | | <0.05 | <0.05 |
| Batch 4: Composition at dose of 2.88 pill/kg/day | 10 | 1.45 ± 0.48 | 8.92 ± 2.72 |
| p in comparison with batch 1 | | >0.05 | >0.05 |
| p in comparison with batch 2 | | <0.05 | <0.05 |

Results from Table 6 showed that 2.4 mg/kg/day diazepam took effects in prolonging the time of convulsion onset and the death time of the mice after nikethamide injection, which was statistically significant in comparison with the model batch (p<0.05).

The composition at doses of 0.96 pill/kg/day and 2.88 pill/kg/day had a tendency to prolong the time of convulsion onset and the death time of the mice after nikethamide injection in comparison with the model batch, but the difference was not statistically significant with p>0.05.

The invention claimed is:

1. An organic sol-gel nano-composition for enhancing cerebral and cardiovascular protection, the nano-composition comprising:
   (a) 15-30% of solid lipid nano Ginkgo biloba;
   (b) 2.78% of solid lipid nano rutin;
   (c) 13.89% of solid lipid nano Panax notoginseng saponins;
   (d) 40-65% of soy bean oil;
   (e) 1-10% of lecithin; and
   (f) 0.1-5% of polyoxyethylene sorbitan monooleate.

2. A process for preparing the nano-composition of claim 1, the process comprising:
   (i) preparing a carrier solution, wherein: the soy bean oil is added to a reaction flask under heating at 70-100° C., and stirred at 250-350 rpm; then the lecithin is added to the reaction flask, boiled and stirred until complete dissolution; and, after 30-50 minutes, the polyoxyethylene sorbitan monooleate is further added to the reaction flask, boiled and stirred for 80-100 minutes until the carrier solution becomes transparent;
   (ii) preparing a conjugated lipid nano-presuspension of three active ingredients/carriers, wherein: the solid lipid nano Panax notoginseng saponins are added to the reaction flask, maintained at 80-90° C. under stirring at 400-600 rpm, stirred and boiled until the solid lipid nano Panax notoginseng saponins are completely dissolved; the solid lipid nano rutin is further added, maintaining at 80-90° C. under stirring at 400-600 rpm until the solid lipid nano rutin is completely dissolved, then, the solid lipid nano Ginkgo biloba is added thereto while maintaining at 80-90° C. under stirring at 400-600 rpm until the solid lipid nano Ginkgo biloba is completely dissolved;
   (iii) preparing a conjugated pre-sol-gel lipid nano-composition of the three active ingredients/carriers, wherein: a carrier mixture containing the solid lipid nano Panax notoginseng saponins, the solid lipid nano rutin, and the solid lipid nano Ginkgo biloba is mixed in 3-24 hours;
   (iv) preparing a conjugated sol-gel lipid nano-composition of the three active ingredients/carriers, wherein: contents of Panax notoginseng saponins, rutin, and Ginkgo biloba in the conjugated pre-sol-gel lipid nano-composition are adjusted; and
   (v) obtaining a finished composition by performing gel formation, wherein the performing of the gel formation comprises performing gelation of the conjugated sol-gel lipid nano-composition at a room temperature, storing the gelled sol-gel lipid nano-composition at a temperature below 24° C., and gel resolution of the stored sol-gel lipid nano-composition at a temperature of 35-37° C.

* * * * *